US006373317B1

(12) United States Patent
Kostiainen et al.

(10) Patent No.: US 6,373,317 B1
(45) Date of Patent: Apr. 16, 2002

(54) INTEGRATED MULTIPLIER CIRCUIT

(75) Inventors: Pekka Kostiainen; Kari Halonen, both of Helsinki; Tuomas Huikko, Espoo, all of (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/582,694

(22) PCT Filed: Dec. 31, 1998

(86) PCT No.: PCT/FI98/01035

§ 371 Date: Oct. 25, 2000

§ 102(e) Date: Oct. 25, 2000

(87) PCT Pub. No.: WO99/35603

PCT Pub. Date: Jul. 15, 1999

(30) Foreign Application Priority Data

Jan. 2, 1998 (FI) ............................................. 98 0005

(51) Int. Cl.[7] ................................................ G06F 7/44

(52) U.S. Cl. ...................................... 327/359; 327/349

(58) Field of Search ................................ 327/359, 346, 327/349, 350, 352, 355, 356, 357, 361

(56) References Cited

U.S. PATENT DOCUMENTS 4,156,283 A 5/1979 Gilbert ........................ 364/841
5,122,983 A 6/1992 Massengill .................. 364/844
5,438,296 A * 8/1995 Kimura ...................... 327/359
5,557,228 A 9/1996 Liu ............................ 327/355
5,703,524 A * 12/1997 Chen .......................... 327/346
5,889,425 A * 3/1999 Kimura ....................... 327/359

FOREIGN PATENT DOCUMENTS

EP 0503628 A2 9/1992
EP 0601543 A1 6/1994
EP 0 672 992 A1 9/1995
EP 0672992 A1 9/1995

OTHER PUBLICATIONS

"An MOS Four–Quadrant Analog Multiplier Using Simple Two–Input Squaring Circuits With Source Followers", Song et al., IEEE Journal of Solid–State Circuits, vol. 25, No. 3, pp. 841–847, 1990.

"Some Circuit Design Techniques For Low–Voltage Analog Functional Elements Using Squaring Circuits", Kimura, IEEE Transactions on Circuits and Systems, vol. 43, No. 7, 1996.

Search Report dated Aug. 1, 2001.

* cited by examiner

*Primary Examiner*—Toan Tran
(74) *Attorney, Agent, or Firm*—Perman & Green, LLP

(57) ABSTRACT

An IC multiplier circuit has four cells having bipolar transistors to give an exponential input-output function. Each cell has a squaring bipolar transistor and an emitter follower. Differential output signals are taken from the squaring bipolar transistor. The voltage follower is an emitter follower with the bias current through it is substantially larger, e.g. about 10 times larger, than the bias current through the squaring bipolar transistor, which has an emitter resistor.

4 Claims, 5 Drawing Sheets

INTEGRATED MULTIPLIER CIRCUIT

Figure 1:
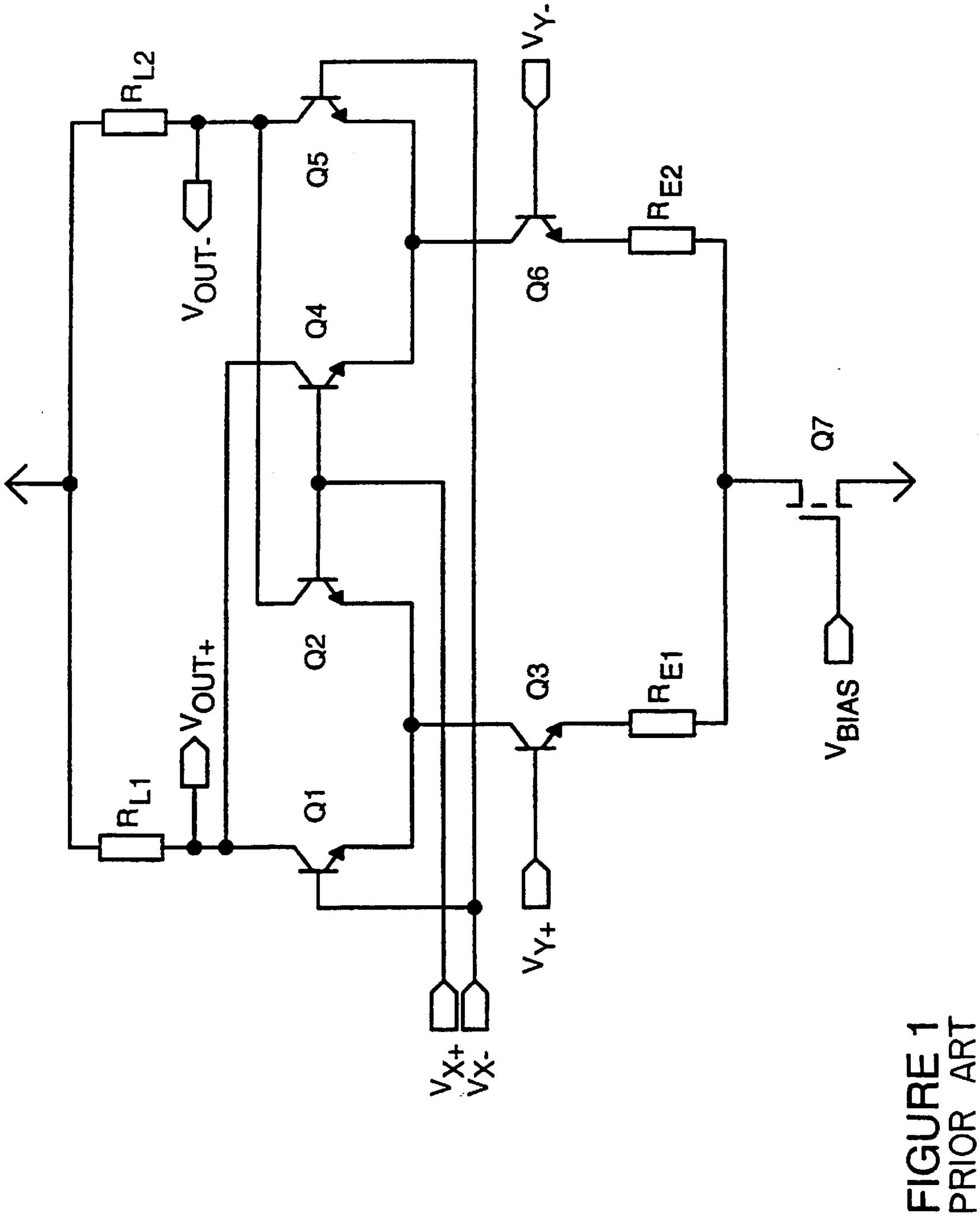
FIGURE 1 PRIOR ART

The invention relates to an integrated multiplier circuit defined in the preamble of independent claim 1.

It is known from the prior art a so-called Gilbert cell which is widely used in integrated multiplier circuits in communications systems, especially in mobile stations. Multiplier circuits are used in integrated IF parts, such as mixers and variable amplifiers. The Gilbert cell is based on current control.

Another prior-art multiplier is disclosed in: Song, H.-J. & Kim C.-K. 1990 An MOS Four-Quadrant Analog Multiplier Using Simple Two-Input Squaring Circuits with Source Follower, IEEE Journal of Solid-state Circuits 25, 3, pp. 841–847. This squaring multiplier is based on a mathematical equation in which the difference of the squares of the sum and difference of two signals gives the product of the signals:

$$(x+y)^2-(x-y)^2=4xy \qquad (1),$$

where x is a first signal and y is a second signal.

The squaring is realized using e.g. an MOS (Metal Oxide Semiconductor) transistor in which the channel current is squarely proportional to the gate voltage. However, the multiplier is preferably realized using bipolar transistors because of their higher speed. The collector current $i_C$ of a bipolar transistor is:

$$i_C = I_S e^{\frac{v_{BE}}{V_T}}, \qquad (2)$$

where the parameters of the bipolar transistor are: saturation current $I_S$, base-emitter voltage $V_{BE}$ and thermal voltage $V_T$. The exponent function is approximated with the first four terms of an infinite Taylor series:

$$i_C = I_S \exp(x) \approx I_S\left\{1 + \frac{1}{1!}x + \frac{1}{2!}x^2 + \frac{1}{3!}x^3\right\}, \qquad (3)$$

where $$x = \frac{v_{BE}}{V_T}, \qquad (4)$$

wherein the parameters shown are the base-emitter voltage $V_{BE}$ and thermal voltage $V_T$ of the bipolar transistor.

Mixers are usually based on a double-balanced structure in which the outputs of four differently phased mixers are summed in order to cancel harmonic effects. Mathematically, the balancing can be expressed as $$(x+y)^2+(-x-y)^2-(x-y)^2-(-x+y)^2=8xy \qquad (5)$$

After substituting the first four terms of the Taylor series into the equation we are still left with the product of input signals:

$$e^{x+y} + e^{-x-y} - e^{x-y} - e^{-x+y} = \frac{8}{2!}xy, \qquad (6)$$

after changing the x and y into symbols representing output signals the final mathematical equation can be given as $$e^{V_{BE}+x+y} + e^{V_{BE}-x-y} - e^{V_{BE}+x-y} - e^{V_{BE}-x+y} = \frac{8}{2!}xy \qquad (7)$$

A problem with the known multiplier circuit based on a Gilbert cell is that it requires a relatively high operating voltage. Normally, it is not possible to decrease the operating voltages of integrated analog circuits only by using new technologies and by modifying design rules. Currently, the operating voltages of analog high-frequency circuits are about 5 V. The operating voltages of many digital circuits are 3.3 V. As the digital components of mobile stations do not need high operating voltages but the analog parts do, the main thing to do in order to save power is to decrease the operating voltages of analog circuits. As a result of the decrease in the operating voltage, many of the circuit connections used in analog high-frequency circuits become useless because then the junction voltages of many transistors cannot be connected in series. Therefore, partly new circuit connections are needed.

A further problem with low operating voltages is the characteristic of integration that causes great parameter variation in the circuits realized. Real resistor values vary by about ±20% and uncompensated bias current by about ±25%. The effect of parameter variation has to be taken into account in the circuit design. When specifying the operating point, safety margins are used. With about one kilo-ohm resistor and several milliamps of current which are typical of IF parts in a mobile station, the voltage between the terminals of the resistor varies from 0.6 V to 1.5 V at the most. This variation causes special problems because of the low operating voltage since the safety margins are narrow.

A further disadvantage of the known multiplier circuits based on Gilbert cells is that their connection together as low-voltage structures is problematic. DC level transfer between blocks has usually been realized by means of emitter followers which have a voltage shift of −0.8 V. This is a lot when compared to a 3-volt operating voltage. Isolating the DC voltages of the blocks by means of capacitors at the intermediate frequency is possible but impractical as at the frequencies used the size of the capacitors will be be fairly big and, on the other hand, the generation of bias voltages and currents for the next stage becomes more difficult.

An object of the invention is to provide a new integrated exponential cell with which the disadvantages described above can be eliminated. An object of the invention in particular is to provide a new exponential cell which operates at a low operating voltage.

The integrated multiplier circuit according to the invention is characterized in what is expressed in the characterizing part of independent claim 1. Preferred embodiments of the invention are disclosed in the characterizing parts of the dependent claims.

The integrated multiplier circuit according to the invention comprises four differently phased exponential cells the outputs of which are summed. In accordance with the invention, each exponential cell is realized using bipolar transistors such that the interdependence of input signals and output signals is exponential, and each exponential cell includes a constant current source to set the operating point of the bipolar transistors, said constant current source preferably being based on an MOS transistor.

In an embodiment of the multiplier circuit each exponential cell has differential inputs which in the different exponential cells are connected crosswise, the first of said inputs being connected to the base of a squaring bipolar transistor and the second to the emitter of a squaring bipolar transistor through a voltage follower, and in which the current through the squaring bipolar transistors of two exponential cells is directed through the same load resistor so that differential output signals are taken from the collectors of the squaring bipolar transistors.

In an embodiment of the multiplier circuit the voltage follower is realized with an emitter follower implemented using a bipolar transistor such that the bias current of the emitter follower is set clearly higher, preferably ten times higher, than the bias current of the squaring bipolar transistor.

In an embodiment of the multiplier circuit the squaring bipolar transistor includes an emitter resistor.

In an embodiment of the multiplier circuit the multiplier circuit is realized using the BiCMOS technology.

An advantage of the invention is that the multiplier circuit and especially its exponential cell are suitable for low operating voltages. The exponential cell has only one transistor stage, compared to the two transistor stages connected in series in the Gilbert cell. The theoretical minimum operating voltage of the Gilbert cell is about 3 V, whereas with the exponential cell according to the invention the operating voltage can be easily realized at the 3-volt level. Furthermore, it is worth noting that the theoretical minimum operating voltage of the exponential cell is clearly lower than this.

Another advantage of the invention is that the multiplier circuit and especially its exponential cell are suitable for a wide frequency range extending from DC to hundreds MHz. The upper frequency limit depends on the technology.

A further advantage of the invention is that the multiplier circuit and especially its exponential cell are suitable for the BiCMOS (Bipolar Complementary Metal Oxide Semiconductor) technology, i.e. a semiconductor technology which comprises both bipolar transistors and MOS transistors, and for bipolar technologies. This semiconductor technology especially facilitates said low operating voltage (down to 2.5 V and below) and high upper frequency limit.

A still further advantage of the invention is the simple exponential cell structure realized using bipolar transistors. The feedback and nonlinearity problems associated with the bipolar structure have been solved in a satisfactory manner. The exponential cell according to the invention operates only at a certain operating point correctly dimensioned and at relatively low signal levels.

Figure 4:
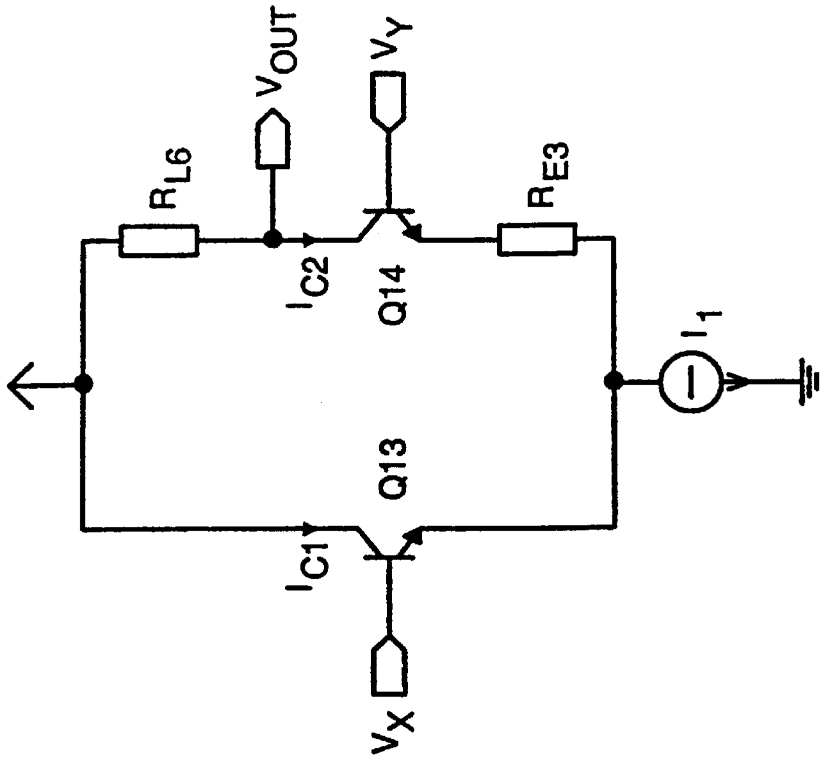
Figure 2:
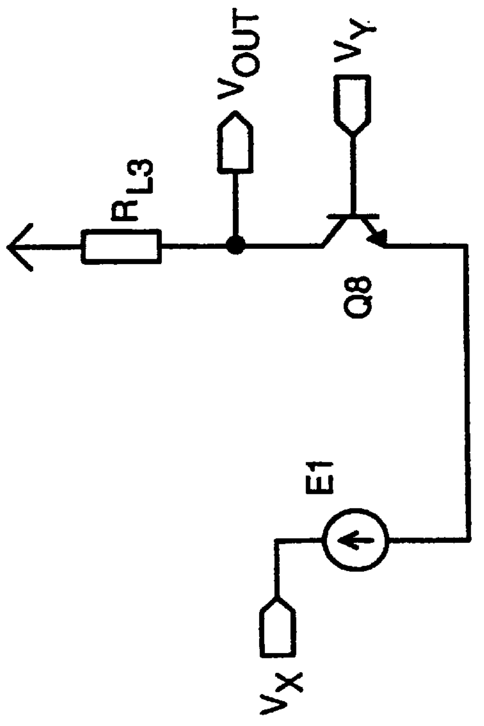
Figure 3:
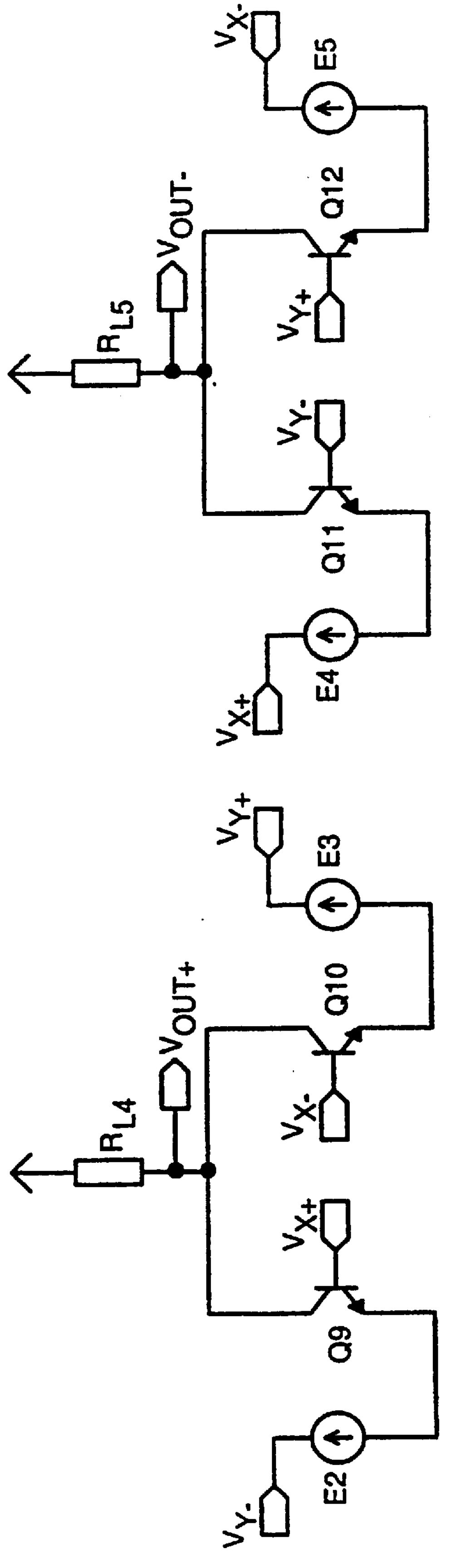
Figure 5:
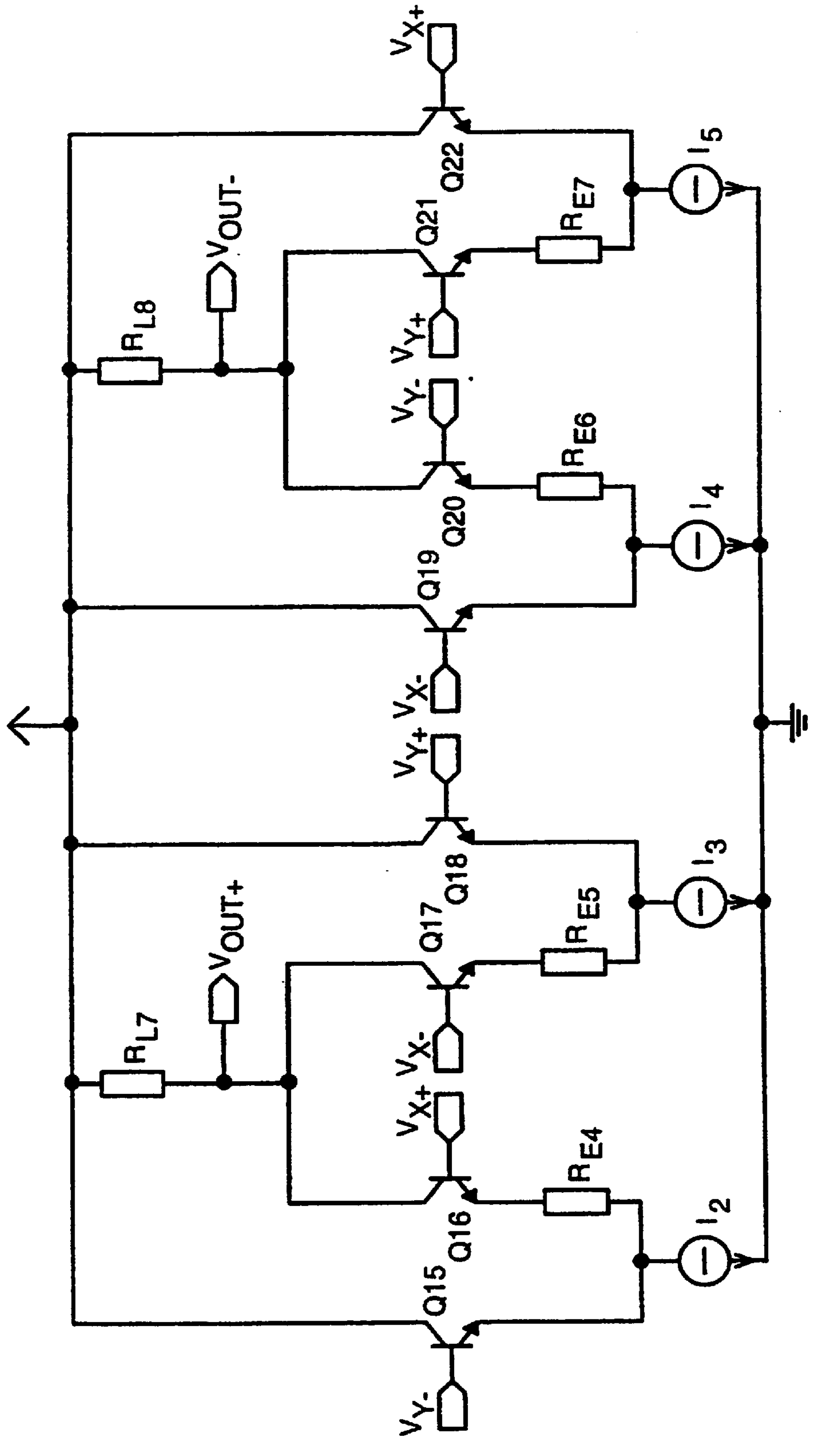
Figure 6:
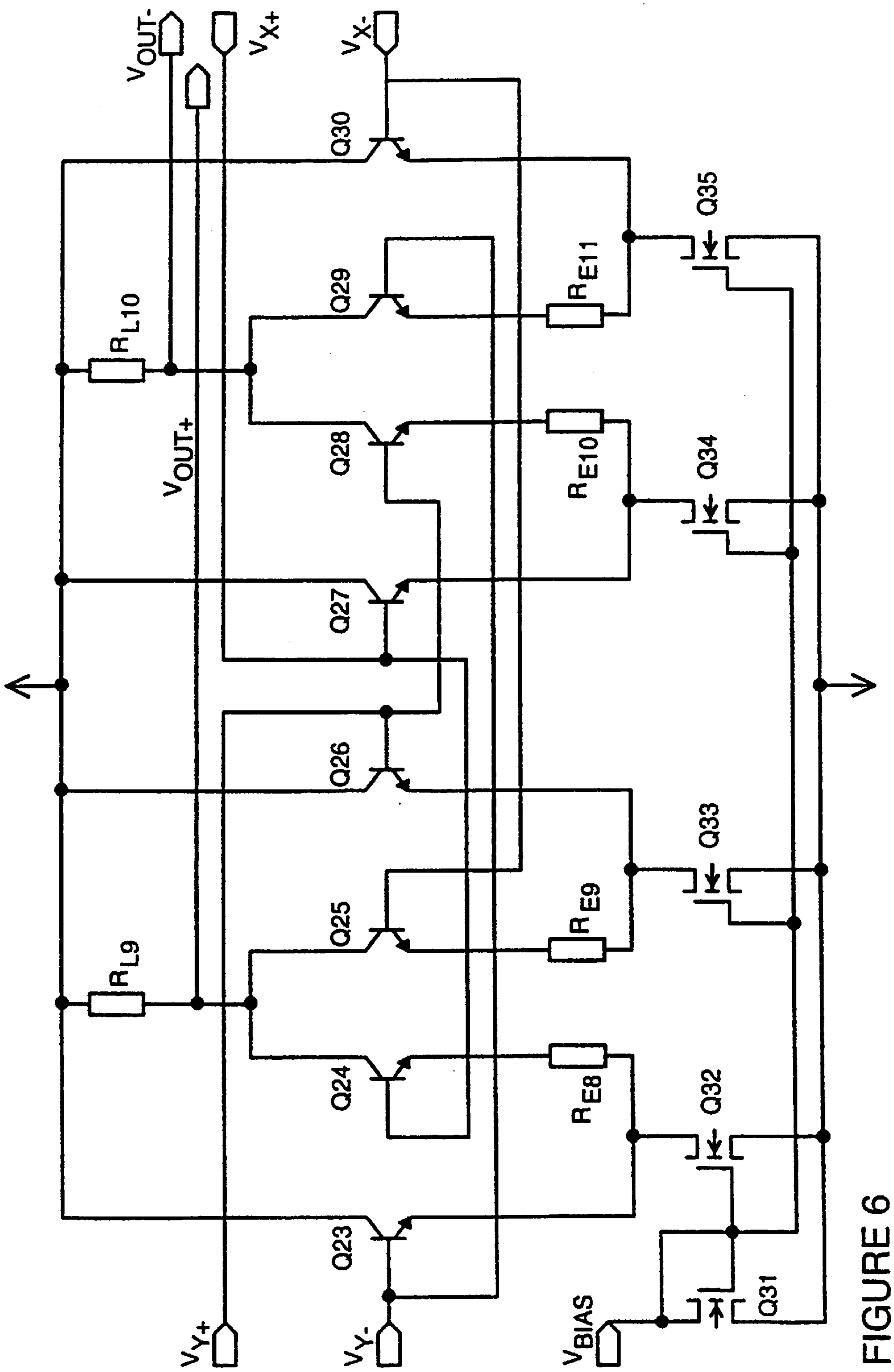

The invention will now be described in more detail with reference to the accompanying drawing wherein FIG. 1 shows the known Gilbert cell, FIG. 2 shows a squaring exponential cell according to the invention, FIG. 3 shows a simplified multiplier circuit, FIG. 4 shows an exponential cell realized using bipolar transistors, FIG. 5 shows a second simplified multiplier circuit realized with bipolar transistors, and FIG. 6 shows a real multiplier circuit based on the simplified circuit of FIG. 5.

FIG. 1 shows a known Gilbert cell which is used in the realization of integrated IF parts such as variable amplifiers and mixers. In the Gilbert cell, two input voltages are multiplied into one output voltage, i.e. the differential voltage at the outputs is the product of the differential voltages at the inputs. A first differential voltage is connected to terminals $V_{X+}$ and $V_{X-}$ wherefrom the voltages are taken to the bases of transistors Q1 and Q2 as well as Q4 and Q5, respectively. A second differential voltage is connected to terminals $V_{Y+}$ and $V_{Y-}$ wherefrom the voltage is amplified by means of transistors Q3 and Q6. Transistors Q3 and Q6 are connected through resistors $R_{E1}$ and $R_{E2}$ to a field effect transistor (FET) Q7 controlled by a bias voltage $V_{BIAS}$ and connected to a negative operating voltage. Transistors Q1 and Q5 amplify a positive differential voltage $V_{X+}$ and $V_{X-}$ which is connected to outputs $V_{OUT+}$ and $V_{OUT-}$. The aforementioned circuit is connected to a positive operating voltage through resistors $R_{L1}$ and $R_{L2}$. Transistors Q2 and Q4 amplify a negative differential voltage $V_{X+}$ and $V_{X-}$ which is connected crosswise to outputs $V_{OUT+}$ and $V_{OUT-}$.

FIG. 2 shows a squaring exponential cell according to the invention in which the exponential function of the sum of two signals is realized by means of a simple bipolar transistor connection. There is a reverse voltage follower E1 that has a voltage $V_{BE1}$. Signal $V_X$ is connected through the reverse voltage follower to the emitter of transistor Q8. Signal $V_Y$ is connected to the base of transistor Q8. The voltage $V_{BE1}$ of the voltage follower E1 is included so that the DC voltage levels of signals $V_X$ and $V_Y$ be equally high and the voltage of transistor Q8 be in the right operating region. The voltage $V_{BE1}$ follows the base-emitter voltage of transistor Q8. The collector of the squaring transistor Q8 is connected to terminal $V_{OUT}$ and across resistor $R_{L3}$ to a positive operating voltage. Signal $V_X$ affects through the voltage follower E1 the potential of the emitter of transistor Q8 and, hence, the voltage difference between the signal $V_Y$ connected to the base and the emitter, producing a current proportional to the exponent of the sum of the voltages. Current flows through the load resistor $R_{L3}$ and produces a voltage between the terminal $V_{OUT}$ and the positive operating voltage.

FIG. 3 shows a simplified squaring multiplier circuit including four exponential cells according to FIG. 2. The multiplier circuit produces the sums and differences of the exponential functions by connecting the transistors' collector current to one load resistor. The differential voltages $V_X$ and $V_Y$ and the differential output signal $V_{OUT}$ are obtained from the difference of two voltage signals as follows:

$$V_X = V_{X+} - V_{X-}$$

$$V_Y = V_{Y+} - V_{Y-}$$

$$V_{OUT} = V_{OUT+} - V_{OUT-}$$

The voltages $V_{BE2}$ to $V_{BE5}$ of the voltage followers E2 to E5 correspond to the voltage $V_{BE1}$ of the voltage follower E1, transistors Q9 to Q12 correspond to transistor Q8, and the load resistors $R_{L4}$ and $R_{L5}$ correspond to the load resistor $R_{L3}$.

FIG. 4 shows an exponential cell realized using bipolar transistors in which the voltage follower E1 of the exponential cell shown in FIG. 2 is implemented by means of an emitter follower comprising a transistor Q13 and an ideal current source $I_1$ connected in series between the operating voltage and the ground. The connection is performed such that the collector of transistor Q13 is connected to the operating voltage, the base to signal $V_X$, and the emitter to a forward ideal current source $I_1$. Transistor Q14 and load resistor $R_{L6}$ correspond to transistor Q8 and load resistor $R_{L3}$ of FIG. 2. The emitter of transistor Q14 is here connected between the emitter resistor $R_{E3}$ transistor Q13 and the ideal current source $I_1$. The voltage across the ideal current source $I_1$ does not follow the base voltage $V_X$ of transistor Q13 as the squaring transistor Q14 also functions as an emitter follower. The effect of the emitter follower can be adapted as desired by varying the ratio of the collector currents of transistors Q13 and Q14 by means of the emitter resistor $R_{E3}$. The exponential cell functions well when the collector current $I_{C1}$ of transistor Q13 is about tenfold compared to the collector current $I_{C2}$ of the squaring transistor Q14. Then, the voltage across the ideal current source $I_1$ follows the voltage of the input signal $V_X$ of the base of transistor Q13. The emitter resistor $R_{E3}$ reduces the nonlinearity of the squaring function as it serves as a feedback to signal $V_Y$ of transistor Q14 and thus reduces exponentiality. So, the emitter resistor $R_{E3}$ makes the gain between the base-emitter voltage and the collector current $I_{C2}$ of transistor Q14 more quadratic. When dimensioning the exponential cell, an optimum is found for the value of the emitter resistor $R_{E3}$.

FIG. 5 shows a more realistic simplified squaring multiplier circuit implemented with bipolar transistors. In this multiplier circuit four exponential cells according to FIG. 4 are connected together. Transistors Q15, Q18, Q19 and Q22 correspond to transistor Q13 of FIG. 4, transistors Q16, Q17, Q20, Q21 correspond to transistor Q14, load resistors $R_{L7}$ and $R_{L8}$ correspond to load resistor $R_{L6}$, emitter resistors $R_{E4}$, $R_{E5}$, $R_{E6}$ and $R_{E7}$ correspond to emitter resistor $R_{E3}$ and the ideal current sources $I_2$ to $I_5$ correspond to the current source $I_1$. Voltages supplied to differential inputs $V_{X+}$ and $V_{X-}$ and $V_{Y+}$ and $V_{Y-}$ are multiplied to differential outputs $V_{OUT+}$ and $V_{OUT-}$.

FIG. 6 shows a real multiplier circuit based on the simplified circuit of FIG. 5. In this multiplier circuit, the ideal current sources $I_2$ to $I_5$ shown in FIG. 5 are replaced with field effect transistors Q32 to Q35 controlled by a bias voltage $V_{BIAS}$. The bias voltage $V_{BIAS}$ is fed back by a field effect transistor Q31.

The invention is not limited to the embodiments described above but many modifications are possible without departing from the scope of the inventional idea defined by the claims set forth below.

What is claimed is:

1. An integrated multiplier circuit comprising four differently phased exponential cells the outputs of which are summed, characterized in that each exponential cell comprises bipolar transistors such that the interdependence of the input signals and output signals is exponential, where each exponential cell comprises differential inputs which are connected crosswise in the different exponential cells, the first one of the inputs being connected to the base of a squaring bipolar transistor and the second one being connected through a voltage follower to the emitter of the squaring bipolar transistor, and in which the current through the squaring bipolar transistors of two exponential cells is directed to flow through the same load resistor so that differential output signals are taken from the collectors of the squaring bipolar transistors, where the voltage follower comprises an emitter follower including a bipolar transistor such that the bias current through the emitter follower is set substantially larger than the bias current through the squaring bipolar transistor, each exponential cell includes a constant current source to set the operating point of the bipolar transistors, and the squaring bipolar transistor includes an emitter resistor.

2. A multiplier circuit of claim 1, characterized in that said constant current source comprises an MOS transistor.

3. The multiplier of claim 1 characterized in that the multiplier circuit comprises BiCMOS transistors.

4. The multiplier circuit of claim 1, wherein the bias current through the emitter follower is about ten times larger than the bias current through the squaring bipolar transistor.

* * * * *